(12) United States Patent
Smith et al.

(10) Patent No.: US 12,046,232 B1
(45) Date of Patent: Jul. 23, 2024

(54) SYSTEMS AND METHODS FOR DETERMINING CONTEXTUAL RULES

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/141,309

(22) Filed: Apr. 28, 2023

(51) Int. Cl.
| | | |
|---|---|---|
| *G10L 15/18* | (2013.01) | |
| *G06N 20/00* | (2019.01) | |
| *G10L 15/06* | (2013.01) | |
| *G10L 15/16* | (2006.01) | |
| *G10L 15/22* | (2006.01) | |

(52) U.S. Cl.
CPC .......... *G10L 15/1815* (2013.01); *G06N 20/00* (2019.01); *G10L 15/063* (2013.01); *G10L 15/22* (2013.01); *G10L 15/16* (2013.01)

(58) Field of Classification Search
CPC ... G10L 15/1815; G10L 15/063; G10L 15/22; G10L 15/16; G06N 20/00
See application file for complete search history.

(56) References Cited

U.S. PATENT DOCUMENTS

| | | | | |
|---|---|---|---|---|
| 9,710,134 | B1* | 7/2017 | Russell | G06F 3/0482 |
| 10,732,789 | B1* | 8/2020 | Marcinelli | G06F 40/205 |
| 11,006,171 | B1* | 5/2021 | Chen | G06F 16/909 |
| 11,354,018 | B2* | 6/2022 | Canneto | G06F 40/205 |
| 2002/0119433 | A1* | 8/2002 | Callender | G09B 7/00 434/322 |
| 2007/0030282 | A1* | 2/2007 | Cash | G06Q 30/00 345/581 |
| 2011/0060587 | A1* | 3/2011 | Phillips | G10L 15/30 704/235 |
| 2015/0149177 | A1* | 5/2015 | Kalns | G10L 15/1822 704/257 |
| 2016/0019661 | A1 | 1/2016 | Bouganim | |
| 2017/0372215 | A1* | 12/2017 | Platt | G06F 16/245 |
| 2019/0188323 | A1* | 6/2019 | Ghosh | G06N 20/00 |
| 2020/0285700 | A1 | 9/2020 | Narayanan | |
| 2021/0065895 | A1 | 3/2021 | Rones | |
| 2021/0225370 | A1* | 7/2021 | Saito | G10L 15/22 |
| 2021/0375272 | A1* | 12/2021 | Madwed | G06F 3/167 |
| 2022/0068494 | A1* | 3/2022 | Op Den Buijs | G16H 80/00 |
| 2022/0138866 | A1 | 5/2022 | Bouganim | |
| 2022/0327954 | A1 | 10/2022 | Margolin | |

\* cited by examiner

*Primary Examiner* — Michael Colucci
(74) *Attorney, Agent, or Firm* — Caldwell Intellectual Property Law

(57) ABSTRACT

Systems and methods for determining contextual rules are described herein. In some embodiments, an apparatus may identify a context datum and an interaction datum as a function of a user datum. In some embodiments, an apparatus may determine an interaction feature and a reaction datum as a function of an interaction datum. In some embodiments, an apparatus may determine a contextual rule as a function of the context datum, interaction feature, and reaction datum. In some embodiments, an apparatus may display a visual element to a user as a function of a contextual rule.

16 Claims, 8 Drawing Sheets

FIG. 7

|  | Monday | Tuesday | Wednesday | Thursday |
|---|---|---|---|---|
| 8 | | | | |
| 9 | | | | |
| 10 | | | | |
| 11 | | | | |
| 12 | | Team Meeting | | |
| 1 | | | | |
| 2 | | | | |
| 3 | | | | |
| 4 | | | | |
| 5 | | | | |
| 6 | | | | |

Team Meeting
12:00PM-1PM
1 Main St
Participant A, Participant B
Contextual recommendations:
- Formal attire
- No discussion of politics
- Language: English

SYSTEMS AND METHODS FOR DETERMINING CONTEXTUAL RULES

FIELD OF THE INVENTION

The present invention generally relates to the field of machine learning. In particular, the present invention is directed to systems and methods for determining contextual rules.

BACKGROUND

Current systems for determining contextual rules may be insufficient, for example, in that they may fail to systematically make use of data from past interactions.

SUMMARY OF THE DISCLOSURE

In an aspect, an apparatus for determining a contextual rule includes at least a processor; and a memory communicatively connected to the at least processor, the memory containing instructions configuring the at least processor to identify a context datum; identify a first interaction datum; determine a first interaction feature as a function of the first interaction datum, using an interaction machine learning model; determine a first reaction datum as a function of the first interaction datum, using a reaction machine learning model; determine a contextual rule as a function of the context datum, the first interaction feature, and the first reaction datum; and determine a visual element data structure as a function of the contextual rule.

In another aspect, a method of determining a contextual rule includes using at least a processor, identifying a context datum; using at least a processor, identifying a first interaction datum; using at least a processor, determining a first interaction feature as a function of the first interaction datum, using an interaction machine learning model; using at least a processor, determining a first reaction datum as a function of the first interaction datum, using a reaction machine learning model; using at least a processor, determining a contextual rule as a function of the context datum, the first interaction feature, and the first reaction datum; and using at least a processor, determining a visual element data structure as a function of the contextual rule.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is an illustration of an exemplary graphical user interface;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for determining a contextual rule. In some embodiments, a user may input a datum indicating a context in which the user plans to have a meeting. In some embodiments, an apparatus described herein may analyze one or more prior interactions with similar contexts or the same context in order to determine one or more contextual rules relevant to the planned meeting. In some embodiments, an apparatus described herein may communicate one or more contextual rules to a user.

Figure 1:
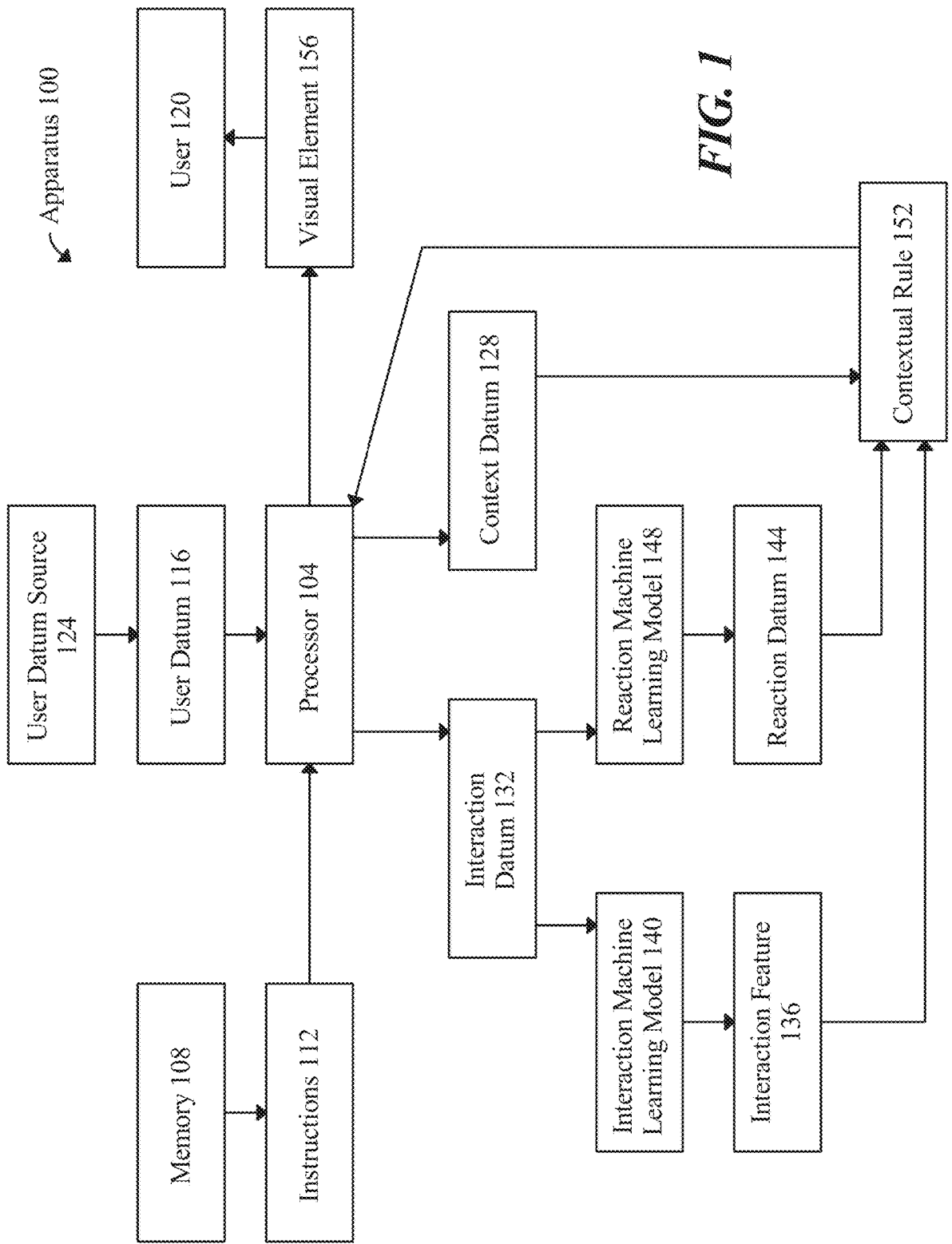
FIG. 1 is a diagram depicting an exemplary apparatus for determining a contextual rule.

Referring now to FIG. 1, an exemplary embodiment of an apparatus 100 for determining a contextual rule is illustrated. Apparatus 100 may include a computing device. Apparatus 100 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

Still referring to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used herein, an "interaction" is a communication between humans. Interactions may include communications made by parties at different times, such as communications by physical mail. Interactions may include remote communications between parties, such as communications by phone or over the internet. Interactions may include one sided communications, such as a text message from a first party to a second party, without a response from the second party. Interactions may include, in non-limiting examples, communications in person, by phone, by SMS, by video conference platform, and by messaging app.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing devices including memory 108 and at least a processor 104 are described in further detail herein.

Still referring to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may receive user datum 116. In some embodiments, apparatus 100 may include at least a processor 104 and memory 108 communicatively connected to the at least processor 104, the memory 108 containing instructions 112 configuring the at least processor 104 to receive user datum 116.

Still referring to FIG. 1, as used herein, a "user datum" is a datum associated with a user. In some embodiments, user datum 116 may include identifying information, and information on an interaction associated with user 120. As a non-limiting example, user datum 116 may include the content of an interaction, such as a recording of an interaction, and/or a transcript of an interaction. As another non-limiting example, user datum 116 may include the context of an interaction, such as its location, the language it is done in, and its time. In some embodiments, user datum 116 may relate to a future interaction. In a non-limiting example, user datum 116 may include a calendar invite relating to a planned meeting between user 120 and another user. In another non-limiting example, user datum 116 may include an airplane ticket associated with user 120. In another non-limiting example, user datum 116 may include a SMS or a smartphone app message inviting user 120 to a meeting.

Still referring to FIG. 1, user datum 116 may be received from a user datum source 124. As used herein, a "user datum source" is a user, memory, or data structure containing a user datum. In some embodiments, user datum source 124 may include one or more user devices, databases, computing devices, and/or users. In non-limiting examples, user devices may include smartphones, smartwatches, tablets, and computers. In some embodiments, a user datum source 124 may include a physical or digital form such as a form on a website or in an application. Exemplary forms include forms collecting information as to planned interactions. In a non-limiting example, user datum source 124 may include a form on a website with fields for a user to enter the time of a future meeting, its planned location, its planned attendees, and information relating to its planned attendees. As another non-limiting example, a user datum source 124 may include a computing device configured to receive user datum 116 using digital tracking, such as gathering information using a device fingerprint that allows a user device to be tracked across the internet. As a non-limiting example, a device fingerprint may allow a user device to be tracked travel websites or social media. In some embodiments, user datum 116 may be received from a third party. In a non-limiting example, a third party may operate a database including user datum 116, processor 104 may request user datum 116 from the database using an application programming interface (API), and processor 104 may receive from the database, or a computing device associated with the database, user datum 116. In a non-limiting example, user 120 may grant processor 104 (or a computing device associated with processor 104) permission to view user 120's calendar, processor 104 (or the associated computing device) may transmit to a computing device associated with user 120's calendar a request for calendar information, and processor 104 (or the associated computing device) may receive the calendar information from a computing device associated with user 120's calendar.

Still referring to FIG. 1, user datum 116 may be input through an interface. An interface may include a graphical user interface (GUI). An interface may include a touchscreen GUI interface. An interface may include a computing device configured to receive an input from a user. In some embodiments. an interface may be configured to prompt a user for an input. In a non-limiting example, an interface may request that a user input a user datum including the context of a planned meeting.

Still referring to FIG. 1, in some embodiments, a user datum source 124 may include a web crawler or may store user datum 116 obtained using a web crawler. A web crawler may be configured to automatically search and collect information related to user 120. As used herein, a "web crawler" is a program that systematically browses the internet for the purpose of web indexing. The web crawler may be seeded with platform URLs, wherein the crawler may then visit the next related URL, retrieve the content, index the content, and/or measures the relevance of the content to the topic of interest. In one embodiment, the web crawler may be configured to scrape user datum 116 from user related social media and networking platforms. The web crawler may be trained with information received from a user through a user interface. As a non-limiting example, a user may input into a user interface, social media platforms they have accounts on and would like to retrieve user data from. A user interface may include a graphical user interface (GUI), command line interface (CLI), menu-driven user interface, touch user interface, voice user interface (VUI), form-based user interface, and the like. Processor may receive user datum 116 including information such as a user's name, user's profile, platform handles, platforms associated with the user, and information relating to planned meetings between user 120 and other users, and the like. In some embodiments, a web crawler may be configured to generate a web query. A web query may include search criteria. Search criteria may include photos, videos, audio, user account handles, web page addresses and the like received from the user. A web crawler function may be configured to search for and/or detect one or more data patterns. A "data pattern" as used in this disclosure is any repeating forms of information. A data pattern may include, but is not limited to, features, phrases, and the like as described further below in this disclosure.

Still referring to FIG. 1, in some embodiments, a web crawler may work in tandem with a program designed to interpret information retrieved using a web crawler. As a non-limiting example, a machine learning model may be used to generate a new query as a function of prior search results. As another non-limiting example, data may be processed into another form, such as by using optical character recognition to interpret images of text. In some embodiments, a web crawler may be configured to determine the relevancy of a data pattern. Relevancy may be determined by a relevancy score. A relevancy score may be automatically generated by processor 104, received from a machine learning model, and/or received from a user. In some embodiments, a relevancy score may include a range of numerical values that may correspond to a relevancy strength of data received from a web crawler function. As a non-limiting example, a web crawler function may search the Internet for data related to planned meetings associated with a user. In some embodiments, computing device may determine a relevancy score of user datum 116 retrieved by a web crawler. As a non-limiting example, if user 120 states in a social media post that user 120 plans to attend an event, then web crawler may formulate a query relating to the event.

Still referring to FIG. 1, in some embodiments, user datum 116 may include a speech datum. In some embodiments, speech datum may be processed using automatic speech recognition. In some embodiments, automatic speech recognition may require training (i.e., enrollment). In some cases, training an automatic speech recognition model may require an individual speaker to read text or isolated vocabulary. In some embodiments, training data may include recordings from historical interactions. In some embodiments, an automatic speech recognition model may be trained using recordings of interactions involving user 120, such as interactions recorded by a user device. In some cases, training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within speech datum, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum aposteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 2-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, user datum 116 may include an audio recording of an interaction involving user 120. In some embodiments, audio data is recorded by a user device, such as a smartphone. In some embodiments, automatic speech recognition may be used to analyze audio data. In some embodiments, automatic speech recognition may be used to convert audio data into a different form of data, such as text. In some embodiments, automatic speech recognition may be used to identify speakers in an interaction, and/or which words within the interaction are spoken by which speakers. Uses of data processed by an automatic speech recognition algorithm are described further below.

Still referring to FIG. 1, in some embodiments, user datum source 124 may include at least a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

Still referring to FIG. 1, in some embodiments, user datum 116 may include video data. In some embodiments, user datum 116 may include video data captured using a camera. In some embodiments, user datum 116 may include video data processed using a machine vision system. In some embodiments, video data may be processed in order to determine one or more features of the body language of a participant to an interaction. In some embodiments, body language may be indicative of a positive or negative reaction to an interaction, as described further below. In some embodiments, body language by a first party may produce a positive or negative reaction to an interaction by a second party, as described further below.

Still referring to FIG. 1, in some embodiments, apparatus 100 may include a machine vision system. In some embodiments, a machine vision system may include at least a camera. A machine vision system may use images, such as images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting examples of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, an exemplary machine vision camera is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Still referring to FIG. 1, in some embodiments, a language model may be used to process user datum 116. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 104 may determine one or more language elements in user datum 116 by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 104 may compare an input such as a sentence from user datum 116 with a list of keywords or a dictionary to identify language elements. For example, processor 104 may identify whitespace and punctuation in a sentence and extract elements comprising a string of letters, numbers or characters occurring adjacent to the whitespace and punctuation. Processor 104 may then compare each of these with a list of keywords or a dictionary. Based on the determined keywords or meanings associated with each of the strings, processor 104 may determine an association between one or more of the extracted strings and a feature of an interaction, such as an association between a string containing the word "Frankfurt" and a planned interaction taking place in the city Frankfurt. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 104 may be configured to determine one or more language elements in user datum 116 using machine learning. For example, processor 104 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 104 may be configured to determine one or more language elements in user datum 116 using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ă/, and/t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and/or run using processor 104, or another computing device. Language classification training data may create associations between any type of language element in any format and other type of language element in any format. Additionally, or alternatively, language classification training data may associate language element input data to a feature of an interaction. For example, language classification training data may associate occurrences of the syntactic elements "meet," "in," and "Frankfurt," in a single sentence with the feature of a meeting taking place in the city Frankfurt.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, a language model may be used to interpret user datum 116 in order to determine context datum 128, as described below.

Still referring to FIG. 1, in some embodiments, apparatus 100 may determine context datum 128. In some embodiments, apparatus 100 may include at least a processor 104 and memory 108 communicatively connected to the at least processor 104, the memory 108 containing instructions 112 configuring the at least processor 104 to determine context datum 128.

Still referring to FIG. 1, as used herein, a "context datum" is a datum describing a context of an interaction, the parties to an interaction, or both. As a non-limiting example, context datum 128 may describe the parties to an interaction. As a non-limiting example, context datum 128 may describe the physical location of an interaction, such as a continent, country, province, or city. As a non-limiting example, context datum 128 may describe the setting of an interaction, such as "in a coffee shop," "in a formal business environment," or "at home." As a non-limiting example, context datum 128 may describe the language an interaction takes place in. As a non-limiting example, context datum 128 may describe the medium by which the interaction takes place in. In non-limiting examples, an interaction medium may include in person, by phone, by video conferencing app, by SMS, or by messaging app. In some embodiments, context datum 128 may describe the planned context of an interaction. In some embodiments, context datum 128 may describe the context of a planned interaction.

Still referring to FIG. 1, in some embodiments, processor 104 may determine context datum 128 as a function of user datum 116. In some embodiments, processor 104 may determine context datum 128 as a function of user datum 116, where user datum 116 indicates a planned interaction. In a non-limiting example, user datum 116 may include calendar data describing a meeting between user 120 and a second user. In this example, processor 104 may determine the location of the meeting as a function of data in the "location" field of the calendar entry, and/or a location specified in the body of the calendar entry or invite. In another non-limiting example, user datum 116 may include an online airplane booking, and processor 104 may determine the location of an interaction to be the destination of the airplane booking. In another non-limiting example, user datum 116 may include SMS messages indicating a planned meeting, and processor 104 may determine the participants in the SMS conversation to be the participants in the planned meeting. In another non-limiting example, user datum 116 may include a social media post indicating that user 120 plans to attend an event, and processor 104 may determine the location of the event based on a query related to an event generated as a function of information indexed by a web crawler.

Still referring to FIG. 1, in some embodiments, processor 104 may determine context datum 128 as a function of two or more elements of user data. In some embodiments, processor 104 may determine context datum 128 as a function of two or more elements of user data, where the two or more elements of user data describe planned interactions with one or more identical qualities. In a non-limiting example, a first user datum 116 may include a calendar invite specifying a time and the participants, and a second user datum 116 may include a text message specifying a location. In this example, processor 104 may determine to use the location from the text message, for example, based on the participants to the conversation being the same as the participants to the planned meeting, use of certain words or phrases in the conversation (such as "where should we meet?"), and/or use of the same words or phrases in the two or more elements of user data. In some embodiments, processor 104 may determine a context datum 128 by determining one or more participants to a meeting and finding additional information about those participants. In a non-limiting example, processor 104 may determine a meeting participant based on the parties to a calendar invite and may determine context datum 128 as a function of contact information for the meeting participant stored on user 120's smartphone. In this example, context datum 128 may include the nationality of the meeting participant, which may be determined, for example, as a function of a home address listed in the contact information. In some embodiments, processor 104 may fill in incomplete data using an internet query. In a non-limiting example, processor 104 may determine a meeting participant based on the parties to a calendar invite and may determine context datum 128 as a function of an internet query related to the meeting participant. In another non-limiting example, a calendar entry may include the heading "biotech conference" and processor 104 may determine which biotech conference is likely the correct one based on an internet query. In this example, processor 104 may make this determination as a function of, for example, what time the conference takes place at and which city it is in. In some embodiments, a language model may be used to determine whether two or more elements of user data refer to the same meeting. For example, a language model may be used to detect words or phrases with the same or very similar meanings, and this may be used to determine two elements of user data to refer to the same meeting. In a non-limiting example, user 120 may make a social media post indicating attendance at a "biotech event" on a particular day, and user 120 may have a calendar entry for "biotech conference" on that day. In this example, a language model may be used to identify that the words "event" and "conference" have similar meanings. In this example, processor 104 may determine that the elements of user data refer to the same event as a function of the output of the language model. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word.

Still referring to FIG. 1, in some embodiments, context datum 128 may be received from a user, such as user 120. In some embodiments, processor 104 may communicate to user 120 a prompt for user 120 to input context datum 128. In some embodiments, such a communication may be done using a user device with a display. Such a display may include a GUI. In some embodiments, user 120 may transmit context datum 128 to processor 104.

Still referring to FIG. 1, in some embodiments, apparatus 100 may identify interaction datum 132. In some embodiments, apparatus 100 may include at least a processor 104 and memory 108 communicatively connected to the at least processor 104, the memory 108 containing instructions 112 configuring the at least processor 104 to identify interaction datum 132.

Still referring to FIG. 1, as used herein, an "interaction datum" is a record of an interaction, a datum describing the content of an interaction, or both. Interaction datum 132 may include, in non-limiting examples, a video recording of an interaction, an audio recording of an interaction, a transcript of an interaction, and a digital image of a physical letter sent to a party. In some embodiments, interaction datum 132 may include, or may be derived from, user datum 116. In some embodiments, interaction datum 132 may be received from user datum source 124. In some embodiments, interaction datum may include an audio and/or video recording from a user device, such as a smartphone. In some embodiments, interaction datum 132 may be received from the internet, such as using a web crawler. In some embodiments, processor 104 may request interaction datum 132 from a database, such as using an API. In some embodiments, interaction datum 132 may be received from a database and/or a computing device associated with the database. In some embodiments, interaction datum 132 relates to an interaction prior to the interaction context datum 128 relates to.

Still referring to FIG. 1, in some embodiments, interaction datum 132 may include communications by one, participant, some portion less than all participants, and/or all participants in an interaction. In some embodiments, interaction datum 132 may be communicated by a subset of participants in an interaction. In some embodiments, interaction datum 132 may include communications by a single participant in an interaction. In some embodiments, isolating communications by participant in an interaction may aid in determining the features of their communications and/or the reactions to their communications. In a non-limiting example, communications may be isolated by participant based on the sender of a message in, for example, a conversation using SMS or a messaging app. In a non-limiting example, communications may be isolated by participant using an automatic speech recognition system; as described above, an automatic speech recognition system may be used to identify a speaker in conversation, and this may be used to categorize communications by speaker in an interaction.

Still referring to FIG. 1, in some embodiments, apparatus 100 may be configured to separate a recording of an interaction, such as a recording that makes up part of and/or includes interaction datum 132 into smaller parts. In some embodiments, this may aid in identifying which specific communication produced a reaction. In some embodiments, a recording may be partitioned when a different participant starts speaking. In some embodiments, a recording may be partitioned in regular time intervals, such as every 5 seconds, 10 seconds, 15 seconds, or 20 seconds. In some embodiments, identifying an interaction datum includes identifying an interaction sequence and identifying an interaction datum as a single communication from a single communicator in the interaction sequence.

Still referring to FIG. 1, in some embodiments, apparatus 100 may determine at least an interaction feature 136; interaction feature 136 may include, without limitation, a first interaction feature and/or a second interaction feature. In some embodiments, apparatus 100 may include at least a processor 104 and memory 108 communicatively connected to the at least processor 104, the memory 108 containing instructions 112 configuring the at least processor 104 to determine interaction feature 136. In some embodiments, interaction feature 136 may be determined as a function of interaction datum 132.

Still referring to FIG. 1, as used herein, an "interaction feature" is a datum describing a feature of an interaction, the subject matter of an interaction, or both. In some embodiments, processor 104 may determine interaction feature 136 using interaction machine learning model 140. In some embodiments, interaction machine learning model 140 may be trained using supervised learning. In some embodiments, interaction machine learning model 140 may include a classifier. In some embodiments, interaction machine learning model 140 may categorize inputs into discrete categories. In some embodiments, interaction machine learning model 140 may be trained on a set of data including historical interactions, associated with ratings as to whether one or more features of an interaction are present. In some embodiments, interaction machine learning model 140 may accept as an input interaction datum 132 and may categorize the interaction datum 132 into one or more categories as an output. In non-limiting examples, historical interactions may be recorded using user devices, obtained from a database, and/or obtained from the internet using a web crawler to identify relevant content. In non-limiting examples, ratings as to whether one or more features of an interaction are present may be obtained using the average score of ratings by humans having observed the interaction (or a reproduction of the interaction). In a non-limiting example, a panel of humans may listen to audio of human speech and provide ratings as to what degree the speaker was honest, sarcastic, and passionate. In this example, the average rating for each category may be taken, and the audio file, associated with the averages for each category, may make up an element of training data for interaction machine learning model 140. In another non-limiting example, users may record interactions using recording capabilities of smartphones, and users may tag moments in an interaction where an interaction participant causes an interaction feature 136, and what type of interaction feature it is (such as attempting to shake hands or speaking with a dismissive tone of voice). In this example, processor 104 may use as a training datum the section of the recording immediately surrounding the user's tag, associated with the type of feature the user specified.

Still referring to FIG. 1, in some embodiments, interaction feature 136 may include the tone of voice used by an interaction participant in verbal communication. In a non-limiting example, interaction feature 136 may include whether a dismissive tone of voice was used. In some embodiments, interaction machine learning model 140 determining the tone of voice used by an interaction participant may use a machine learning algorithm described with reference to automatic speech recognition above. In some embodiments, machine learning model 140 determining the tone of voice used by an interaction participant may accept as an input audio data.

Still referring to FIG. 1, in some embodiments, interaction feature 136 may include whether specific body language was used. In a non-limiting example, interaction feature 136 may include whether an interaction participant initiated a "high five." In some embodiments, interaction machine learning model 140 determining body language used by an interaction participant may use a machine learning algorithm described with reference to a machine vision system above. In a non-limiting example, interaction machine learning model 140 may be trained on video data, associated with human-assigned values representing whether a participant initiated a "high five," whether a participant pointed, and whether a participant bowed.

Still referring to FIG. 1, in some embodiments, interaction feature 136 may include the subject matter of a communication. In a non-limiting example, interaction feature 136 may include whether the communication relates to baseball. In some embodiments, an automatic speech recognition system may be used to convert an audio file to text, and a language model may be used to interpret this text, such that the subject matter of a communication may be determined. In some embodiments, interaction machine learning model 140 determining subject matter communicated by an interaction participant may use a machine learning algorithm described with reference to an automatic speech recognition system and/or a language model above. In a non-limiting example, interaction machine learning model 140 may be trained on text data, associated with a human-selected word or phrase describing the subject matter of the text data.

Still referring to FIG. 1, in some embodiments, a fuzzy inferencing system may be used to determine interaction feature 136. In some embodiments, certain features of interactions may partially fit into categories. In some embodiments, a communication may be partially truthful. In some embodiments, a communication may partially relate to baseball. In some embodiments, fuzzy sets and fuzzy inferencing systems may be used to categorize data that partially fits into one or more categories. In a non-limiting example, a plurality of humans may listen to an audio recording and provide ratings for the degree to which the speaker was honest, the degree to which the speaker was sarcastic, and the degree to which the speaker was passionate, each as a percent. In this example, the average rating for each category may be taken, and this average may be used as the percent membership of the audio recording in the respective category. Fuzzy sets and fuzzy inferencing systems are described in further detail below.

Still referring to FIG. 1, in some embodiments, user datum 116 and/or interaction datum 132 may be converted into a different form. Data formats may be converted in a variety of ways, such as without limitation, using a speech to text function or using optical character recognition. In some embodiments, user datum 116 and/or interaction datum 132 may be converted into a different form such that it is in a form appropriate for input into a function. As a non-limiting example, a interaction machine learning model 140 may only accept inputs in a particular format, and user datum 116 and/or interaction datum 132 may be converted into that format such that it may be effectively input into interaction machine learning model 140.

Still referring to FIG. 1, in some embodiments, apparatus 100 may determine reaction datum 144. In some embodiments, apparatus 100 may include at least a processor 104 and memory 108 communicatively connected to the at least processor 104, the memory 108 containing instructions 112 configuring the at least processor 104 to determine reaction datum 144. In some embodiments, reaction datum 144 may be determined as a function of interaction datum 132.

Still referring to FIG. 1, as used herein, a "reaction datum" is a datum describing an interaction participant's reaction to a communication between interaction participants. In some embodiments, reaction datum 144 may describe a positive reaction. In some embodiments, reaction datum 144 may describe a negative reaction. In some embodiments, reaction datum 144 may describe the degree to which a reaction is positive or negative. Reaction datum 144 may describe the degree to which a reaction expressed, in non-limiting examples, surprise, belief in what the communicator said, boredom, interest, the degree to which the reactor was impressed, and the like.

Still referring to FIG. 1, in some embodiments, processor 104 may use reaction machine learning model 148 to determine reaction datum 144. In some embodiments, reaction machine learning model 148 may be trained using unsupervised learning. In some embodiments, reaction machine learning model 148 may include a classifier. In some embodiments, reaction machine learning model 148 may be trained on a set of data including historical interactions, associated with whether particular reactions are present. In some embodiments, reaction machine learning model 148 may accept as an input interaction datum 132 and may output a measure of whether a particular reaction is present. In some embodiments, whether particular reactions are present may be determined based on human-assigned ratings. In a non-limiting example, a plurality of humans may watch a video recording of an interaction and may provide ratings as to whether the listener believed what was being said and whether the listener was interested in what was being said. In this example, the ratings for each category may be averaged, and an element of training data may include the video recording, associated with the average rating for each category. These ratings may be paired with the video recordings, and such pairs may be used as elements of training data for reaction machine learning model 148. In another non-limiting example, users may record interactions using recording capabilities of smartphones, and users may tag moments in an interaction where an interaction participant has a reaction, and how positive or negative the reaction is. In this example, processor 104 may use as a training datum the section of the recording immediately surrounding the user's tag, associated with the type of reaction the user specified.

Still referring to FIG. 1, in some embodiments, reaction machine learning model 148 may be trained using a regression model. Reaction machine learning model 148 may include, in a non-limiting example, a linear regression algorithm. Reaction machine learning model 148 may be trained using, in non-limiting examples, batch gradient descent or stochastic gradient descent. In some embodiments, reaction machine learning model 148 may be trained on a data set including historical interactions, associated with measures of the degree to which a reaction was positive or negative. In some embodiments, reaction machine learning model 148 may accept as an input interaction datum 132 and may output an estimate of the degree to which interaction datum 132 contains a positive or negative response. In some embodiments, the degree to which a reaction was positive or negative may be determined using an average of ratings by a plurality of humans. In a non-limiting example, a plurality of humans may observe a recording of an interaction and may rate the degree to which a reaction was positive or negative. In this example, the recording, associated with the average rating, may be used as a training datum for training reaction machine learning model 148. In some embodiments, reaction machine learning model 148 may output a datum on a continuous scale.

Still referring to FIG. 1, in some embodiments, reaction machine learning model 148 may be trained using a reinforcement learning algorithm. In some embodiments, reaction machine learning model 148 may be trained by inputting a historical interaction datum into reaction machine learning model 148, receiving an output, and inputting a value that is a function of how close to correct the output was.

Still referring to FIG. 1, in some embodiments, a fuzzy inferencing system may be used to determine reaction datum 144. In a non-limiting example, a reaction described by interaction datum 132 may have partial membership in a "positive reaction" category, partial membership in a "neutral reaction" category, and partial membership in a "negative reaction" category. In this example, reaction datum 144 may be determined as a function of the reaction's membership in each category. In a non-limiting example, the centroid of a shape determined by the reaction's membership in each category may be used to determine reaction datum 144. Fuzzy inferencing systems and fuzzy sets are described in further detail below.

Still referring to FIG. 1, in some embodiments, reaction datum 144 may be determined as a function of the same interaction datum 132 as an interaction datum 132 used to determine interaction feature 136. In some embodiments, reaction datum 144 may be determined as a function of a different interaction datum 132 than an interaction datum 132 used to determine interaction feature 136. In some embodiments, interaction datum 132 used to determine reaction datum 144 is from the same interaction as interaction datum 132 used to determine interaction feature 136. In some embodiments, interaction datum 132 used to determine reaction datum 144 describes a segment of an interaction immediately following interaction datum 132 used to determine interaction feature 136.

Still referring to FIG. 1, in some embodiments, apparatus 100 may determine contextual rule 152. In some embodiments, apparatus 100 may include at least a processor 104 and memory 108 communicatively connected to the at least processor 104, the memory 108 containing instructions 112 configuring the at least processor 104 to determine contextual rule 152.

Still referring to FIG. 1, as used herein, a "contextual rule" is an association between a context datum, an interaction feature, and a reaction datum. In some embodiments, contextual rule 152 may be determined as a function of context datum 128. In some embodiments, contextual rule 152 may be determined as a function of interaction feature 136. In some embodiments, contextual rule 152 may be determined as a function of reaction datum 144. In some embodiments, contextual rule 152 may be determined as a function of a single context datum 128, interaction feature 136, and reaction datum 144. In some embodiments, contextual rule 152 may be determined as a function of multiple sets of context data 128, interaction features 136, and reaction data 144. In a non-limiting example, many interaction feature 136 and reaction datum 144 pairs may be analyzed, each having the context datum 128 of a meeting in a formal business environment with a German banker. In this example, if interactions including the interaction feature 136 of initiating a "high five" consistently result in a reaction datum 144 indicating a negative reaction, then contextual rule 152 may indicate that initiating a "high five" is likely to produce a negative response.

Still referring to FIG. 1, in some embodiments, contextual rule 152 may be determined based on interactions partially matching that of a desired context. In a non-limiting example, a contextual rule 152 associated with the context of a formal business environment with a German banker may be desired. In this situation, many interaction feature 136 and reaction datum 144 pairs may be analyzed, each having the context datum 128 of a meeting in a formal business environment with a German individual (even if none of the individuals are bankers). In this example, if interactions including the interaction feature 136 of initiating a "high five" consistently result in a reaction datum 144 indicating a negative reaction, then contextual rule 152 may indicate that initiating a "high five" in the context of a meeting in a formal business environment with a German banker is also likely to produce a negative response. Processor 104 may select interaction feature 136 and reaction datum 144 pairs to analyze based on how closely related they are to a desired context. In a non-limiting example, if a contextual rule 152 on the context of a meeting in a formal business environment with a German banker is desired, then interaction feature 136 and reaction datum 144 pairs may be selected based on which pairs are associated with context datum 128 most closely related to the desired context. In this example, an interaction feature 136 and reaction datum 144 pair may be selected for analysis based on the context being a meeting in a formal business environment with a Danish banker, where a interaction feature 136 and reaction datum 144 pair with a less relevant context may not be selected.

Still referring to FIG. 1, in some embodiments, whether to determine a contextual rule 152 and/or which contextual rule 152 to determine may be determined as a function of user datum 116. In a non-limiting example, if user datum 116 indicates that user 120 plans to meet a Canadian athlete in an informal environment, then processor 104 may perform a process described herein in order to determine contextual rule 152 with respect to the context of a meeting with a Canadian athlete in an informal environment. A processor 104 may determine whether to determine a contextual rule 152 and/or which contextual rule 152 to determine as a function of context datum 128 relevant to a planned meeting, as described above.

Still referring to FIG. 1, in some embodiments, a plurality of contextual rules 152 relevant to a planned meeting are determined. In some embodiments, a plurality of contextual rules may aid user 120 in gaining a more complete understanding of optimal behavior in the planned context. In some embodiments, processor 104 may be configured to identify a context datum; identify a first interaction datum; identify a second interaction datum; determine a first interaction feature as a function of the first interaction datum, using an interaction machine learning model; determine a second interaction feature as a function of the second interaction datum, using the interaction machine learning model; determine a first reaction datum as a function of the first interaction datum, using a reaction machine learning model; determine a second reaction datum as a function of the second interaction datum, using the reaction machine learning model; and determine a contextual rule as a function of the context datum, the first interaction feature, the second interaction feature, the first reaction datum, and the second reaction datum.

Still referring to FIG. 1, in some embodiments, contextual rule 152, once determined, may be stored in memory 108 and/or a database. In some embodiments, processor 104 may retrieve a predetermined contextual rule 152 instead of re-doing the analysis upon determining to provide a contextual rule 152.

Still referring to FIG. 1, a datum may be represented as or in a data structure. In some embodiments, a data structure may include one or more functions and/or variables, as a class might in object-oriented programming. In some embodiments, a data structure may include data in the form of a Boolean, integer, float, string, date, and the like. In a non-limiting example, a context datum 128 data structure may include a string value representing a text description of the location of a planned meeting. In some embodiments, data in a data structure may be organized in a linked list, tree, array, matrix, tenser, and the like. In a non-limiting example, training data used to train interaction machine learning model 140 may be organized in a list. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NO SQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, an interaction datum 132 data structure including an audio recording may be partitioned into a first audio recording of a communication (which may be input into interaction machine learning model 140) and second audio recording of a reaction to the communication (which may be input into reaction machine learning model 148). In another non-limiting example, reaction datum 144 may be read by processor 104 in order for processor 104 to determine contextual rule 152.

Still referring to FIG. 1, in some embodiments, a data structure may be calibrated. In some embodiments, a data structure may be trained using a machine learning algorithm. In a non-limiting example, reaction machine learning model 148 may be trained using an algorithm that minimizes a cost function, such as in a least squares linear regression model. In a non-limiting example, a data structure may include an array of data representing the biases of connections of a neural network. In this example, the neural network may be trained on a set of training data, and a back propagation algorithm may be used to modify the data in the array.

Still referring to FIG. 1, in some embodiments, a data structure may include categorical data. In a non-limiting example, a data structure may include a reaction datum 144 representing whether an interaction participant has a positive reaction to a communication. In some embodiments, a data structure may include data that has partial membership in a category. In a non-limiting example, reaction datum 144 may be a variable within the range [0:1], where its value represents the percentage membership of a participant's reaction to a communication in the "positive" category. Fuzzy sets and fuzzy inferencing systems are described further herein.

Still referring to FIG. 1, in some embodiments, apparatus 100 may determine a visual element data structure. In some embodiments, apparatus 100 may include at least a processor 104 and memory 108 communicatively connected to the at least processor 104, the memory 108 containing instructions 112 configuring the at least processor 104 to determine a visual element data structure. In some embodiments, processor 104 may determine a visual element data structure as a function of contextual rule 152.

Still referring to FIG. 1, in some embodiments, a visual element data structure may include a visual element 156. In some embodiments, a visual element data structure may include a rule for displaying visual element 156. In some embodiments, a visual element data structure may be determined as a function of contextual rule 152. In some embodiments, a visual element data structure may be determined as a function of an item from the list consisting of user datum 116, context datum 128, interaction datum 132, interaction feature 136, reaction datum 144, and contextual rule 152. In a non-limiting example, a visual element data structure may be generated such that visual element 156 describing or highlighting contextual rule 152 is displayed to a user 120. As a non-limiting example, a visual element data structure may be generated such that visual element 156 describing contextual rule 152 is displayed in the context of a datum relevant to an interaction. In non-limiting examples, a visual element 156 including contextual rule 152 may be displayed within a calendar invite, and/or beside an SMS conversation discussing a planned meeting. In another non-limiting example, visual element 156 may include a list of contextual rules 152, each associated with a degree of confidence that the contextual rule 152 is correct and/or applicable to a desired context.

Still referring to FIG. 1, in some embodiments, visual element 156 may include one or more elements of text, images, shapes, charts, particle effects, interactable features, and the like. In a non-limiting example, a visual element 156 may display a table including relevant interaction features, 136, associated reaction data 144, and associated context data 128.

Still referring to FIG. 1, a visual element data structure may include rules governing if or when visual element 156 is displayed. In a non-limiting example, a visual element data structure may include a rule causing a visual element 156 describing contextual rule 152 to be displayed when a user selects contextual rule 152 using a GUI.

Still referring to FIG. 1, a visual element data structure may include rules for presenting more than one visual element 156, or more than one visual element 156 at a time. In an embodiment, about 1, 2, 3, 4, 5, 10, 20, or 50 visual element 156 are displayed simultaneously.

Still referring to FIG. 1, a visual element data structure rule may apply to a single visual element 156 or datum, or to more than one visual element 156 or datum. A visual element data structure may categorize data into one or more categories and may apply a rule to all data in a category, to all data in an intersection of categories, or all data in a subsection of a category (such as all data in a first category and not in a second category). As a non-limiting example, the same formatting may consistently be applied to contextual rules 152 included in visual elements 156. A visual element data structure may rank data or assign numerical values to them. As a non-limiting example, contextual rules may be ranked according to a degree of confidence in the data supporting the contextual rules. A numerical value may, in a non-limiting example, measure the degree to which a first datum is associated with a category or with a second datum. As an example, visual element 156 may display the degree to which interaction feature 136 is associated with a negative reaction datum 144. In a non-limiting example, visual element data structure may apply rules based on a comparison between a ranking or numerical value and a threshold. In a non-limiting example, a visual element 156 may highlight contextual rules 152 for which there is a higher degree of confidence than a threshold. Rankings, numerical values, categories, and the like may be used to set visual element data structure rules. Similarly, rankings, numerical values, categories, and the like may be applied to visual elements, and visual elements may be applied based on them.

Still referring to FIG. 1, in some embodiments, visual element 156 may be interacted with. For example, visual element 156 may include an interface, such as a button or menu. In some embodiments, visual element 156 may be interacted with using a user device such as a smartphone.

Still referring to FIG. 1, in some embodiments, apparatus 100 may determine visual element 156. In some embodiments, apparatus 100 may include at least a processor 104 and a memory 108 communicatively connected to the at least processor 104, the memory 108 containing instructions 112 configuring the at least processor 104 to determine visual element 156.

Still referring to FIG. 1, in some embodiments, apparatus 100 may display visual element 156 to user 120. In some embodiments, apparatus 100 may include at least a processor 104 and a memory 108 communicatively connected to the at least processor 104, the memory 108 containing instructions 112 configuring the at least processor 104 to display visual element 156 to user 120.

Still referring to FIG. 1, in some embodiments, apparatus 100 may transmit visual element 156 to a display. A display may communicate visual element 156 to user 120. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user 120 to input data into the display. Interactive elements may be configured to enable interaction between a user and a computing device. In some embodiments, a visual element data structure is determined as a function of data input by user 120 into a display.

Still referring to FIG. 1, in some embodiments, a visual element data structure may be generated such that visual element 156 including a contextual rule 152 is displayed within or beside a visual element associated with an interaction, where the interaction is planned to take place with a context relevant to the contextual rule 152.

Figure 2:
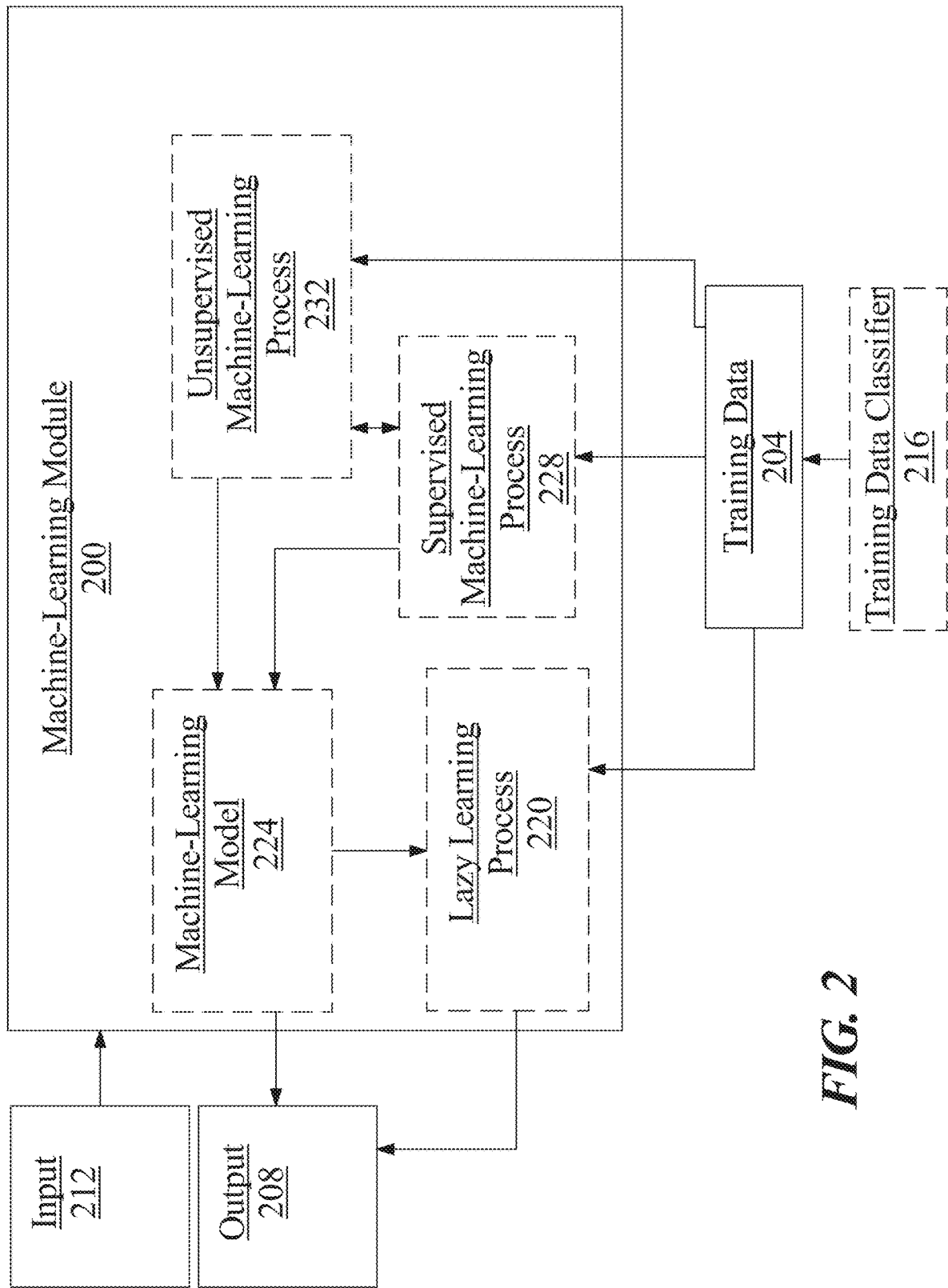
FIG. 2 is a diagram depicting an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, an input may include interaction datum 132 and an output may include reaction datum 144.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to whether a reaction was positive or negative.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include interaction datum 132 as described above as inputs, reaction datum 144 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
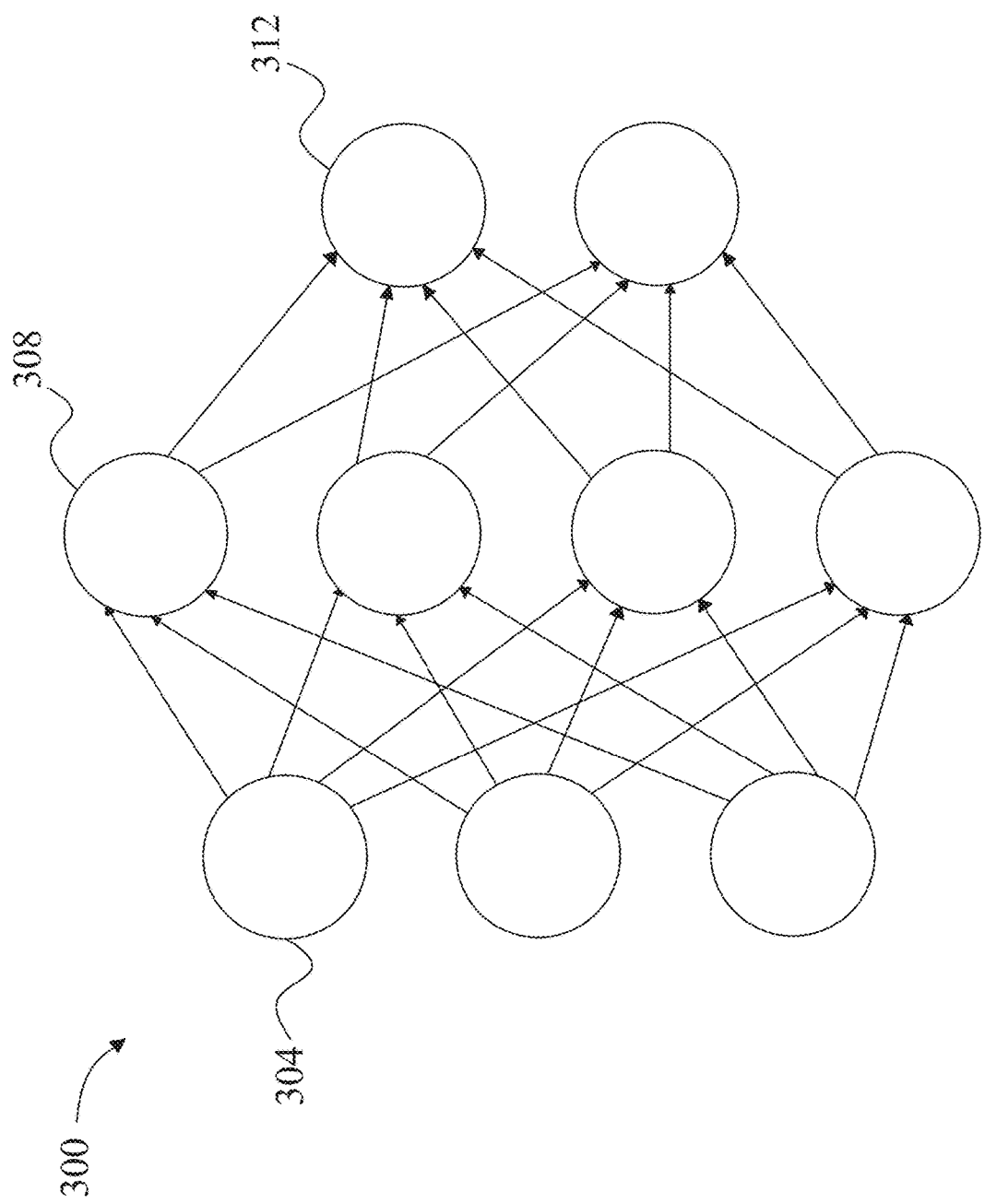
FIG. 3 is a diagram depicting an exemplary neural network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
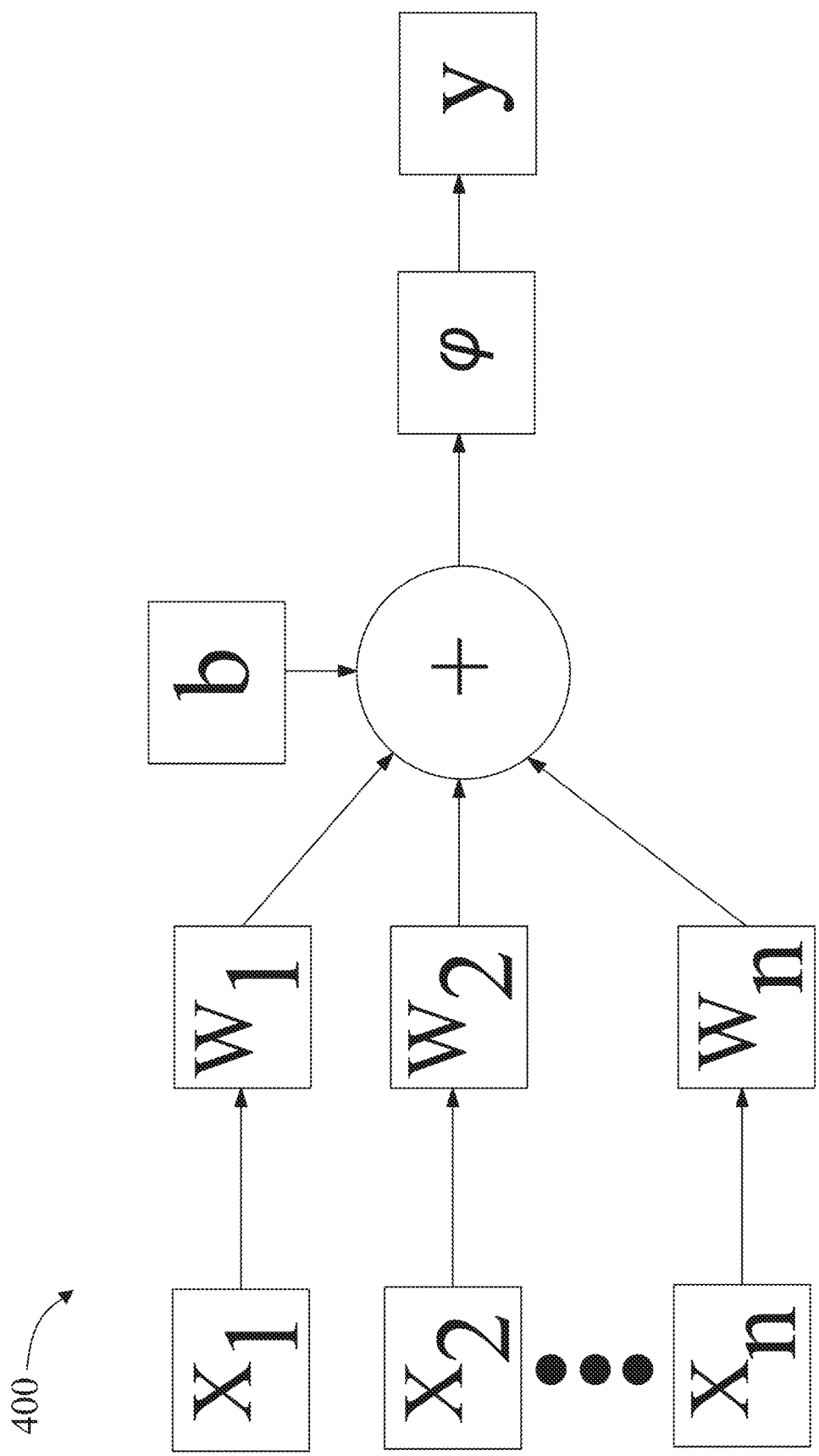
FIG. 4 is a diagram depicting an exemplary neural network node.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x) = \tan h^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x * \text{sigmoid}(x)$, a Gaussian error linear unit function such as $f(x) = a(1 + \tan h \ (\sqrt{2/\pi}(x + bx^r)))$ for some values of a, b, and r, and/or a scaled exponential linear unit function such as $$f(x) = \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
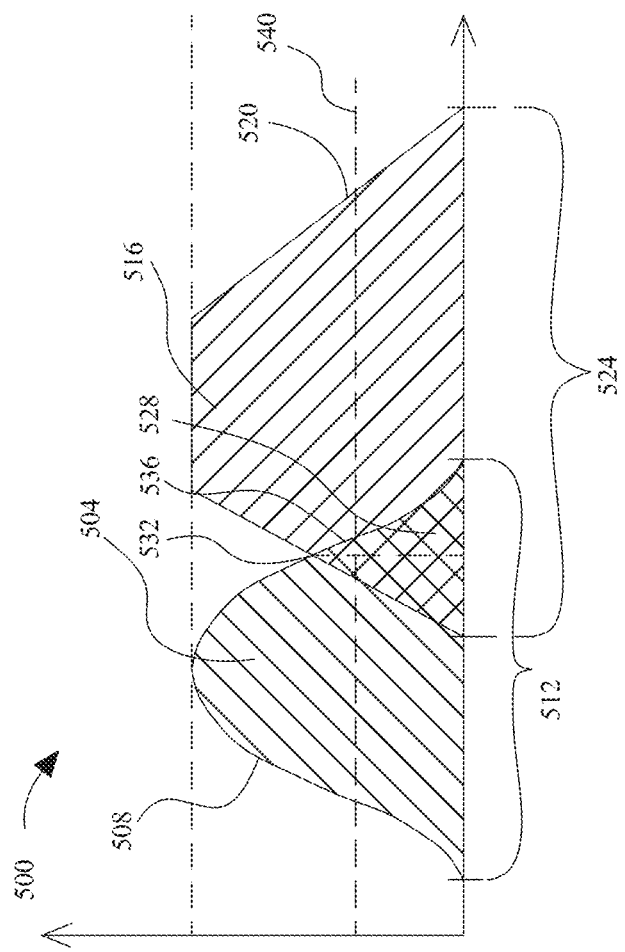
FIG. 5 is a diagram depicting an exemplary comparison between fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, interaction datum 132, and a predetermined class, such as without limitation of reaction category. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or interaction datum 132 and a predetermined class, such as without limitation reaction category categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify an interaction datum 132 with reaction category. For instance, if a reaction category has a fuzzy set matching interaction datum 132 fuzzy set by having a degree of overlap exceeding a threshold, processor 104 may classify the interaction datum 132 as belonging to the reaction category categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, an interaction datum 132 may be compared to multiple reaction category categorization fuzzy sets. For instance, interaction datum 132 may be represented by a fuzzy set that is compared to each of the multiple reaction category categorization fuzzy sets; and a degree of overlap exceeding a threshold between the interaction datum 132 fuzzy set and any of the multiple reaction category categorization fuzzy sets may cause processor 104 to classify the interaction datum 132 as belonging to reaction category categorization. For instance, in one embodiment there may be two reaction category categorization fuzzy sets, representing respectively whether a reaction was positive or negative. First reaction category categorization may have a first fuzzy set; Second reaction category categorization may have a second fuzzy set; and interaction datum 132 may have an interaction datum 132 fuzzy set. processor 104, for example, may compare an interaction datum 132 fuzzy set with each of reaction category categorization fuzzy set and in reaction category categorization fuzzy set, as described above, and classify an interaction datum 132 to either, both, or neither of reaction category categorization or in reaction category categorization. Machine-learning methods as described throughout may, in a non-limiting example, generate coefficients used in fuzzy set equations as described above, such as without limitation x, c, and β of a Gaussian set as described above, as outputs of machine-learning methods. Likewise, interaction datum 132 may be used indirectly to determine a fuzzy set, as interaction datum 132 fuzzy set may be derived from outputs of one or more machine-learning models that take the interaction datum 132 directly or indirectly as inputs.

Figure 6:
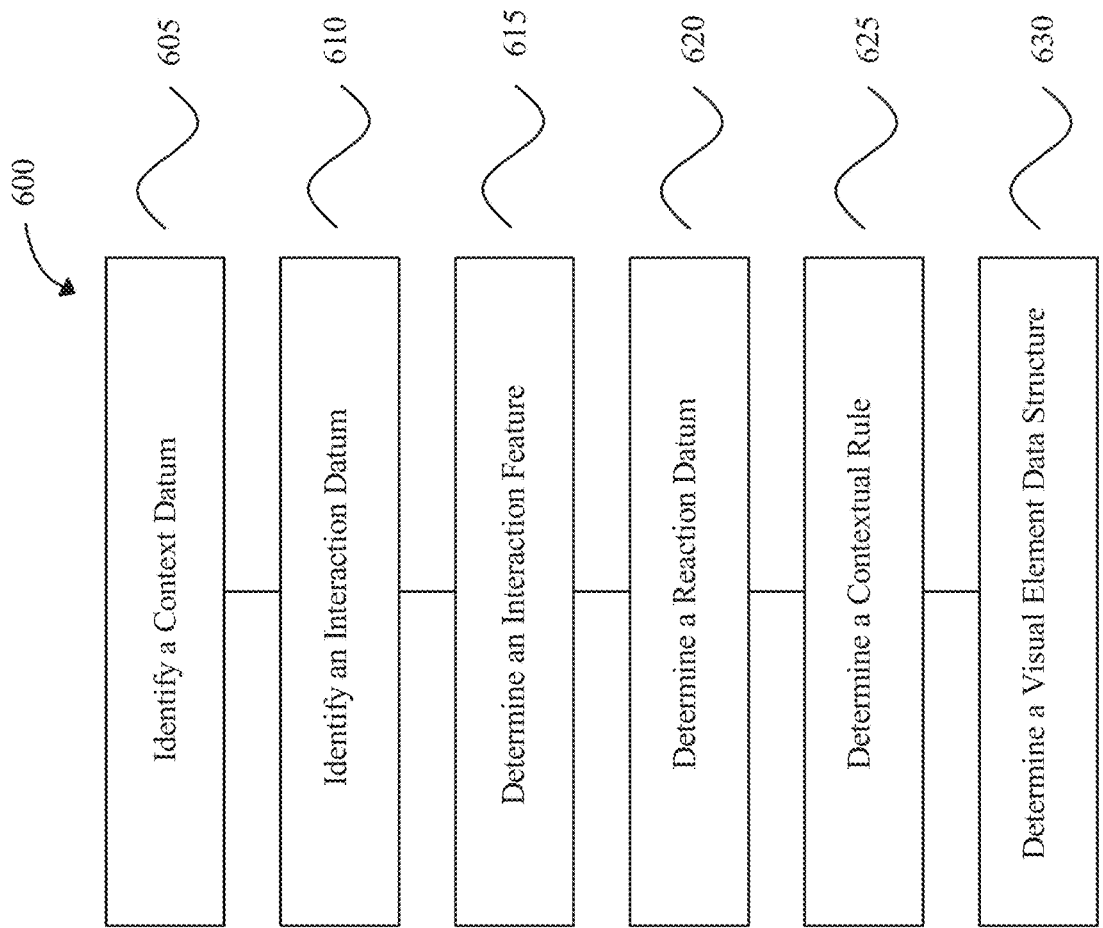
FIG. 6 is a diagram depicting an exemplary method of determining a contextual rule.

Referring now to FIG. 6, an exemplary embodiment of a method 600 of determining a contextual rule is illustrated. In some embodiments, method 600 includes identifying a context datum 605. In some embodiments, identifying a context datum includes receiving a user datum and identifying the context datum as a function of the user datum. In some embodiments, method 600 includes identifying a first interaction datum 610. In some embodiments, identifying a first interaction datum includes identifying a first interaction sequence and identifying a first interaction datum as a single communication from a single communicator in the first interaction sequence. In some embodiments, first interaction datum includes a recording of human speech. In some embodiments, method 600 includes determining a first interaction feature as a function of the first interaction datum 615. In some embodiments, determining a first interaction feature as a function of the first interaction datum is done using an interaction machine learning model. In some embodiments, interaction machine learning model is configured to categorize inputs into discrete categories. In some embodiments, method 600 includes determining a first reaction datum as a function of the first interaction datum 620. In some embodiments, determining a first reaction datum as a function of the first interaction datum is done using a reaction machine learning model. In some embodiments, reaction machine learning model is configured to output a datum on a continuous scale. In some embodiments, method 600 includes determining a contextual rule 625. In some embodiments, determining a contextual rule is done as a function of a context datum, a first interaction feature, and a first reaction datum. In some embodiments, method 600 includes determining a visual element data structure as a function of contextual rule 630. In some embodiments, method 600 further including identifying a second interaction datum, determining a second interaction feature as a function of a second interaction datum, using a interaction machine learning model, determining a second reaction datum as a function of the second interaction datum, using the reaction machine learning model, and determining a contextual rule as a function of the context datum, the first interaction feature, the second interaction feature, the first reaction datum, and the second reaction datum. In some embodiments, identifying a second interaction datum includes identifying a second interaction sequence and identifying a second interaction datum as a single communication from a single communicator in the second interaction sequence. In some embodiments, first interaction datum and second interaction datum each include a recording of human speech. In some embodiments, method 600 further includes determining a visual element as a function of the data structure and displaying the visual element to a user. In some embodiments, a method step described herein is done using at least a processor.

Now referring to FIG. 7, a non-limiting example of one or more GUI elements is illustrated. In some embodiments, GUI 700, and/or one or more elements of GUI 700 may be displayed on a user device. GUI elements may include, without limitation, one or more contextual rules 704, and one or more meeting details 708. In some embodiments, processor 104 may transmit to a user device a data structure that configures the user device to display GUI 700 and/or one or more elements of GUI 700; in some embodiments, such a data structure may include a visual element data structure.

Still referring to FIG. 7, in some embodiments, GUI 700 may include one or more contextual rules 704. In some embodiments, contextual rules 152 presented as element 704 may be in the form of recommendations. In some embodiments, the order in which contextual rules 152 appear and/or which contextual rules 152 appear may be a function of user defined settings. In a non-limiting embodiment, a user may select to receive contextual rules 152 on body language, but not on attire. In some embodiments, the order in which contextual rules 152 appear and/or which contextual rules 152 appear may be a function of a measure of the strength of the contextual rule 152. As a non-limiting example, if apparatus 100 has large amounts of data indicating that formal attire is preferable in a given context, but very little data on which language is preferable in that context, then apparatus 100 may display as element 704 a contextual rule 152 recommending formal attire but may not display a contextual rule 152 on language. In some embodiments, element 704 is displayed upon a user selecting a meeting, calendar entry and/or calendar invite.

Still referring to FIG. 7, in some embodiments, GUI 700 may include one or more meeting details 708. In some embodiments, meeting details 708 may be formatted to indicate which meeting details were used to determine contextual rules, and/or their relative importance in determining contextual rules. In some embodiments, a user may select a meeting detail, and apparatus 100 may determine and/or highlight contextual rules associated with that meeting detail. As a non-limiting example, a user may select a meeting participant, and apparatus 100 may determine and display as element 704 one or more contextual rules based only on that meeting participant and no other meeting participants.

Still referring to FIG. 7, in some embodiments, a computing device may display and/or configure a user device to display GUI 700 and/or may display and/or configure a user device to display a change in GUI 700 as a result of an event. In some embodiments, a computing device displaying and/or configuring a user device to display GUI 700 may produce a signal when an event occurs, and the computing device may modify GUI 700 as a result of the signal. Events may include, in non-limiting examples, a user hovering the cursor over an element, a user clicking on an element, a user pressing a key on a keyboard, a video ending, a user scrolling a mouse wheel, an error occurring, and the like. In some embodiment, a computing device may include event handler code that runs when an event occurs, causing a change in GUI 700. As non-limiting examples, events may result in a request being sent to an API, playing an animation, copying data to the clipboard, and entering full screen mode. As a non-limiting example, an event may include clicking on a calendar entry, and this may cause event handler code to cause a more detailed description of the calendar entry to be displayed. In this example, the more detailed description of the calendar entry may include elements 704 and 708.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
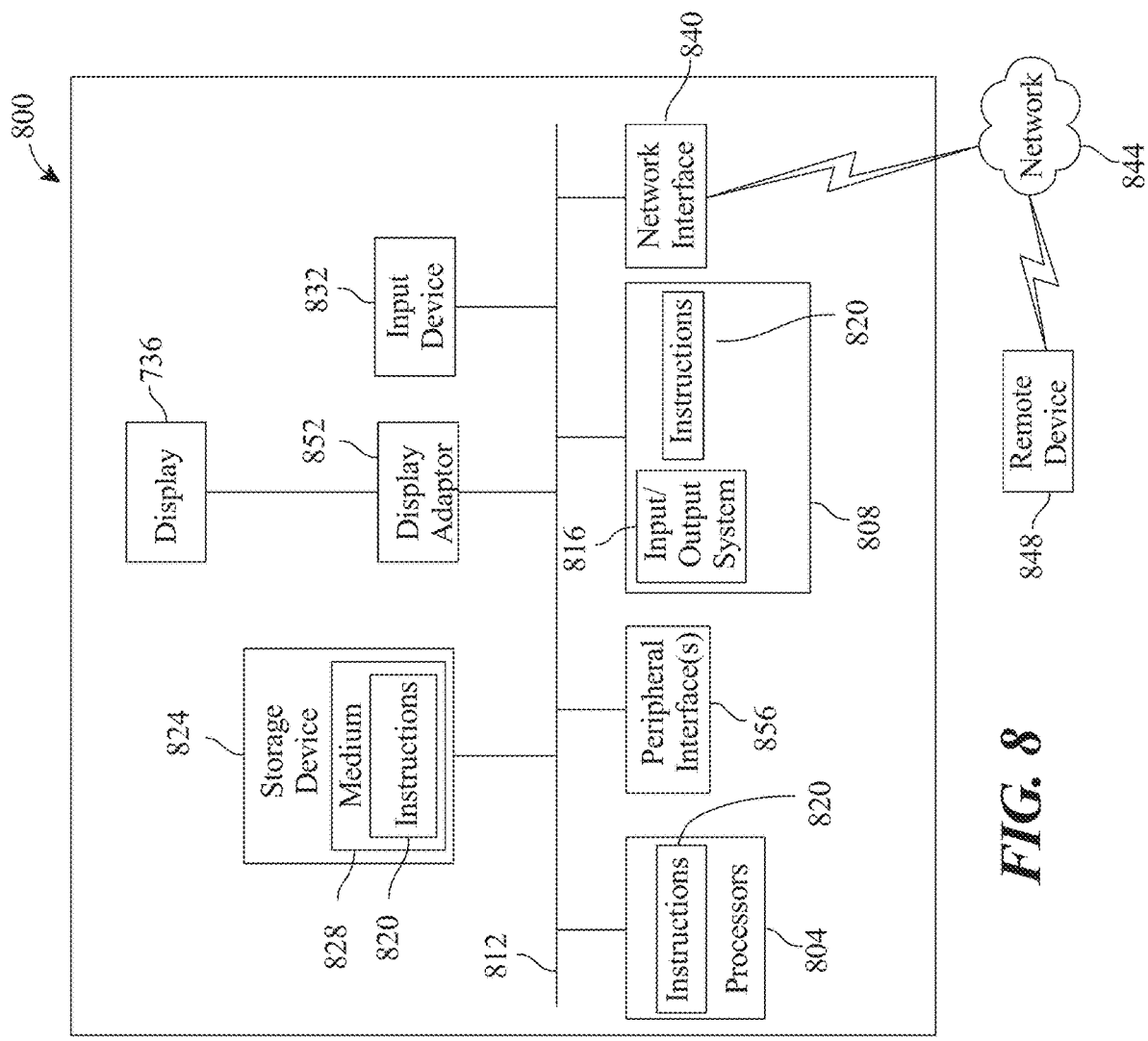
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for determining a contextual rule, the apparatus comprising:
    at least a processor; and
    a memory communicatively connected to the at least processor, the memory containing instructions configuring the at least processor to:
        receiving a user datum, wherein the user datum comprises a plurality of data elements describing at least one planned interaction;
        identify a context datum by processing the received user datum using a plurality of processing models, wherein identifying the context datum comprises:
            determine at least two identical data elements of the plurality of data elements using the plurality of processing model; and
            identify the context datum as a function of the at least two identical data elements of the plurality of data elements;
        identify a first interaction datum;
        determine a first interaction feature as a function of the first interaction datum, using an interaction machine learning model;
        determine a first reaction datum as a function of the first interaction datum, using a reaction machine learning model;
        determine a contextual rule as a function of the context datum, the first interaction feature, and the first reaction datum; and
        determine a visual element of a visual element data structure as a function of the data structure, wherein the visual element data structure comprises:
            a plurality of rules governing timing of a display and formatting of the visual element; and
            a degree of confidence related to the contextual rule; and
        display the visual element to a user by formatting the visual element based on a rule of the plurality of rules related to the degree of confidence.

2. The apparatus of claim 1, wherein identifying a first interaction datum comprises:
    identifying a first interaction sequence; and
    identifying a first interaction datum as a single communication from a single communicator in the first interaction sequence.

3. The apparatus of claim 1, wherein the first interaction datum comprises a recording of human speech.

4. The apparatus of claim 1, wherein the interaction machine learning model is configured to categorize inputs into discrete categories.

5. The apparatus of claim 1, wherein the reaction machine learning model is configured to output a datum on a continuous scale.

6. The apparatus of claim 1, wherein the memory contains instructions configuring the at least processor to:
    identify a second interaction datum;
    determine a second interaction feature as a function of the second interaction datum, using the interaction machine learning model;
    determine a second reaction datum as a function of the second interaction datum, using the reaction machine learning model; and
    determine a contextual rule as a function of the context datum, the first interaction feature, the second interaction feature, the first reaction datum, and the second reaction datum.

7. The apparatus of claim 6, wherein identifying a second interaction datum comprises:
    identifying a second interaction sequence; and
    identifying a second interaction datum as a single communication from a single communicator in the second interaction sequence.

8. The apparatus of claim 6, wherein the first interaction datum and the second interaction datum each comprise a recording of human speech.

9. A method of determining a contextual rule, the method comprising:
    using at least a processor, receiving a user datum comprising a plurality of data elements describing at least one planned interaction;
    using at least a processor, identifying a context datum by processing the received user datum using a plurality of processing models, wherein identifying the context datum comprises:

determining at least two identical data elements of the plurality of data elements using the plurality of processing model; and identifying the context datum as a function of the at least two identical data elements of the plurality of data elements;

using the at least a processor, identifying a first interaction datum;

using the at least a processor, determining a first interaction feature as a function of the first interaction datum, using an interaction machine learning model;

using the at least a processor, determining a first reaction datum as a function of the first interaction datum, using a reaction machine learning model;

using the at least a processor, determining a contextual rule as a function of the context datum, the first interaction feature, and the first reaction datum; and using the at least a processor, determining a visual element of a visual element data structure as a function of the data structure, wherein the visual element data structure comprises:

a plurality of rules governing timing of a display and formatting of the visual element; and a degree of confidence related to the contextual rule; and using the at least a processor, displaying the visual element to a user by formatting the visual element based on a rule of the plurality of rules related to the degree of confidence.

10. The method of claim 9, wherein identifying a first interaction datum comprises:

identifying a first interaction sequence; and identifying a first interaction datum as a single communication from a single communicator in the first interaction sequence.

11. The method of claim 9, wherein the first interaction datum comprises a recording of human speech.

12. The method of claim 9, wherein the interaction machine learning model is configured to categorize inputs into discrete categories.

13. The method of claim 9, wherein the reaction machine learning model is configured to output a datum on a continuous scale.

14. The method of claim 9, further comprising:

identifying a second interaction datum;

determining a second interaction feature as a function of the second interaction datum, using the interaction machine learning model;

determining a second reaction datum as a function of the second interaction datum, using the reaction machine learning model; and determining a contextual rule as a function of the context datum, the first interaction feature, the second interaction feature, the first reaction datum, and the second reaction datum.

15. The method of claim 14, wherein identifying a second interaction datum comprises:

identifying a second interaction sequence; and identifying a second interaction datum as a single communication from a single communicator in the second interaction sequence.

16. The method of claim 14, wherein the first interaction datum and the second interaction datum each comprise a recording of human speech.

* * * * *